United States Patent [19]
Wakeman

[11] 4,178,773
[45] Dec. 18, 1979

[54] MATERIAL HANDLING SYSTEM
[75] Inventor: Alden H. Wakeman, Lake Mills, Wis.
[73] Assignee: Crepaco, Inc., Lake Mills, Wis.
[21] Appl. No.: 889,731
[22] Filed: Mar. 24, 1978
[51] Int. Cl.² .............................................. F25C 5/14
[52] U.S. Cl. ..................................... 62/341; 414/222
[58] Field of Search ................ 62/60, 341; 198/430; 214/164 R

[56] References Cited
U.S. PATENT DOCUMENTS

| | | | |
|---|---|---|---|
| 2,808,921 | 11/1957 | Knowles | 198/430 |
| 2,812,050 | 11/1957 | Amerio et al. | 198/430 |
| 2,842,253 | 7/1958 | Amerio et al. | 198/430 |
| 2,882,697 | 4/1959 | Amerio et al. | 62/158 |
| 2,927,443 | 3/1960 | Knowles | 62/341 |
| 3,557,975 | 1/1971 | Amerio | 214/16.4 R |
| 3,713,304 | 1/1973 | Knutrud | 62/341 |
| 4,083,199 | 4/1978 | Gram | 62/341 |

OTHER PUBLICATIONS
Brochure: Jackstone Froster Ltd., *Automatic Double Contact Plate Freezer.*

Primary Examiner—Ronald C. Capossela
Attorney, Agent, or Firm—Neuman, Williams, Anderson & Olson

[57] ABSTRACT

A material handling system is provided for preventing direct contact between products as they are successively fed through a contact plate freezer. Each successively fed product is encompassed by a framelike member prior to entering the freezer. Each framelike member is of substantially rigid construction and has sidewalls having a height substantially equal to the height of the encompassed product. As the encompassed products are fed through the freezer, the framelike members of successive products abut one another. Upon being discharged from the freezer, the framelike member is removed from the frozen product.

6 Claims, 7 Drawing Figures

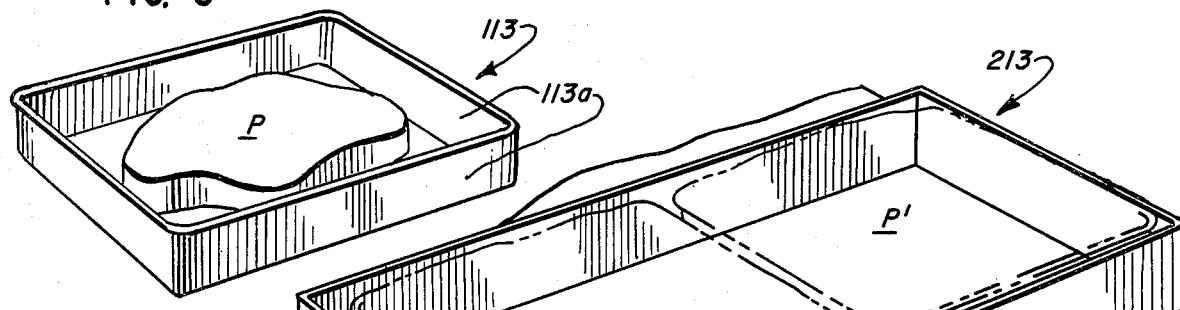
FIG. 5
FIG. 6
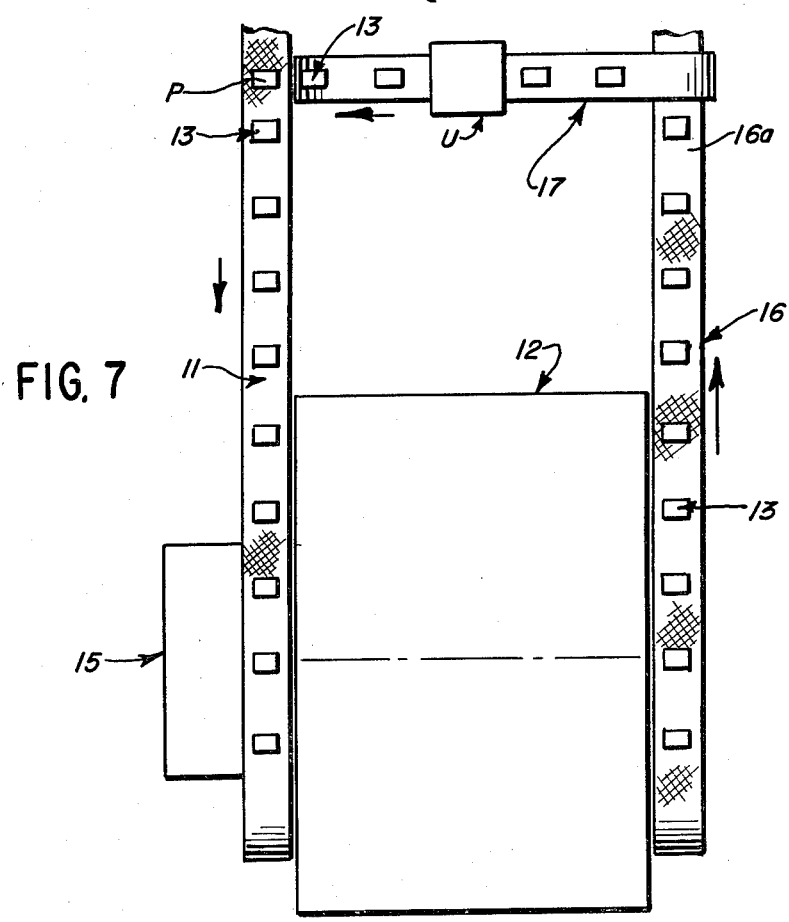
FIG. 7

MATERIAL HANDLING SYSTEM

BACKGROUND OF THE INVENTION

Contact plate freezers, because of their high efficiency in energy usage, have been extensively used in commercial food processing plants to freeze prepackaged foods which are of the type customarily offered for retail sale in the frozen food section of a supermarket or the like. Such freezers, however, have heretofore been restricted to handling products which are disposed in rectangular or square shaped cartons of various thicknesses, lengths and widths and formed of a rigid or semirigid material. The need for such shaped cartons is that as they are fed through the freezer the prepackaged products are pushed against one another. In the operation of the freezer, the prepackaged (carton) product is contacted by upper and lower refrigerated plates and is subjected to substantial vertical load because it supports the plates disposed thereabove. After the freezing has been conpleted the prepackaged products have a tendency to freeze onto the plates and therefore must be broken loose, when the plates are spread apart, by a pusher bar which pushed against the frozen packages disposed between the plates. The carton also serves to shield the product from direct contact with the refrigerating plates.

To enhance the esthetics and at the same time reduce the cost of the frozen product, cartons or containers of a variety of types, shapes and sizes have been utilized with the result that pushing of such packages against one another while being fed through the freezer has produced disastrous results. For example, a very common container used in the packaging of convenience foods is an aluminum drawn tray or plate having outwardly flared, or divergent, sidewalls terminating in a laterally extending flange or lip. If an attempt is made to shove or push one of these containers against another, the lip of one container will ride up against the other causing an overlap or one container will ride over the other. If the container is a plate, such relative movement between abutting containers will likely cause damage or severe distortion of the containers and spillage of the products resulting in contamination of the equipment. In addition, when the containers are severely distorted and/or ride over one another, a serious jamming problem will develope requiring a complete shutdown of the equipment for a substantial period of time to allow at least partial thawing of the jammed packages. The time loss and the product spoilage resulting from such shutdown are serious and, therefore, the use of contact plate freezer when handling such products has been avoided or at most significantly curtailed, notwithstanding the energy efficiency of such a freezer.

SUMMARY OF THE INVENTION

Thus, it is an object of the invention to provide a material handling system which enables products having a variety of types, shapes, and sizes to be readily fed through a contact plate freezer.

It is a further object of the invention to provide a material handling system which eliminates product spillage while the product is being fed through a contact plate freezer.

It is a still further object of the invention to provide a material handling system which is simple and efficient in operation and preserves the esthetic appearance of the product and its package.

Further and additional objects will appear from the description, accompanying drawings and appended claims.

DESCRIPTION

For a more complete understanding of the invention reference should be made to the drawings wherein:

FIG. 5 is a fragmentary perspective view similar to FIG. 4 but showing a product encompassed by a second form of the framelike member.

FIG. 6 is similar to FIG. 5 but showing a plurality of products encompassed within a third form of framelike member.

FIG. 7 is a fragmentary diagrammatic top view of the freezer of FIG. 1 and showing the conveyor system therefor.

Figure 1:
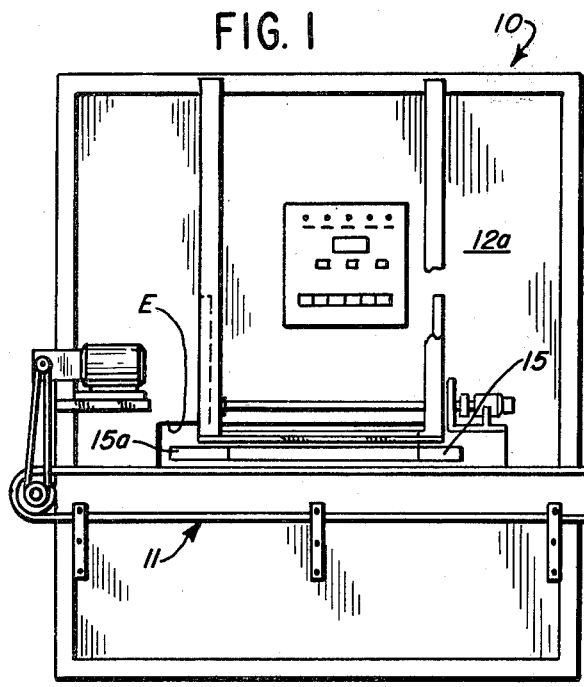
FIG. 1 is a fragmentary front elevational view of one form of a contact plate freezer.
Figure 2:
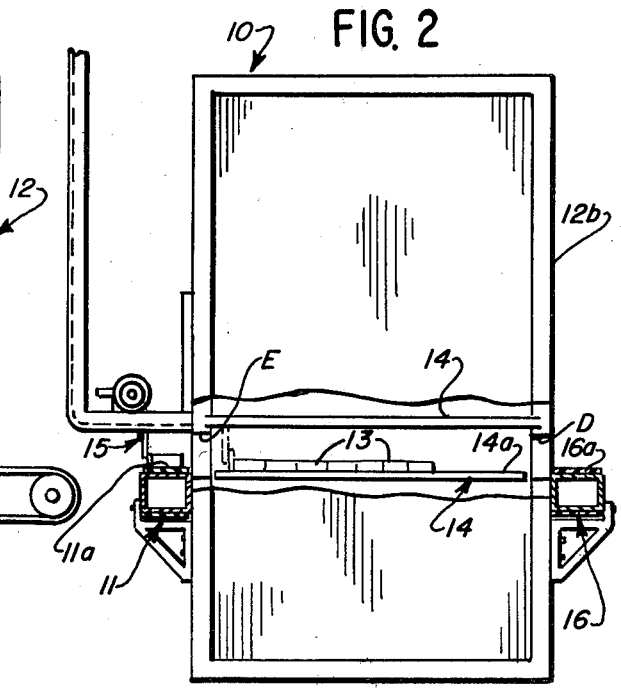
FIG. 2 is a fragmentary side elevational view of the freezer of FIG. 1 and showing the front and rear conveyors therefor in vertical section and with a portion of the freezer housing removed so as to show one of a pair of adjacent refrigerated plates being loaded with products encompassed by the framelike members.
Figure 3:
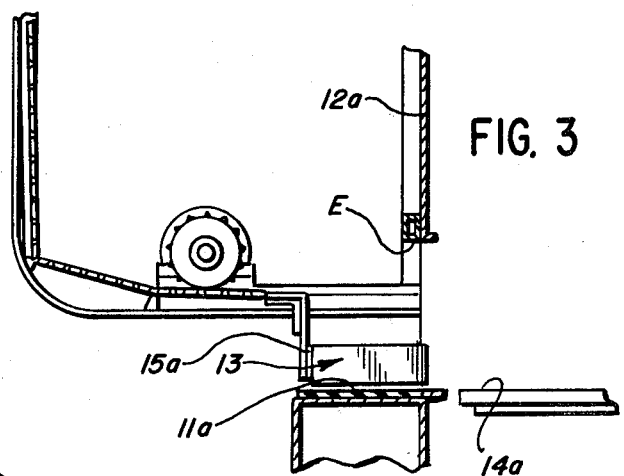
FIG. 3 is an enlarged fragmentary vertical sectional view of the infeed section of the freezer of FIG. 1.

Referring now to the drawings and more particularly to FIGS. 1 and 2, a contact plate freezer 10 is shown which may be of a type disclosed in U.S. Pat. No. 3,557,975, issued Jan. 26, 1971. The freezer 10 is of a type particularly suitable for use in the commercial freezing of prepackaged products P, such as convenience food or the like, commonly sold in supermarts or similar retail outlets.

Figure 4:
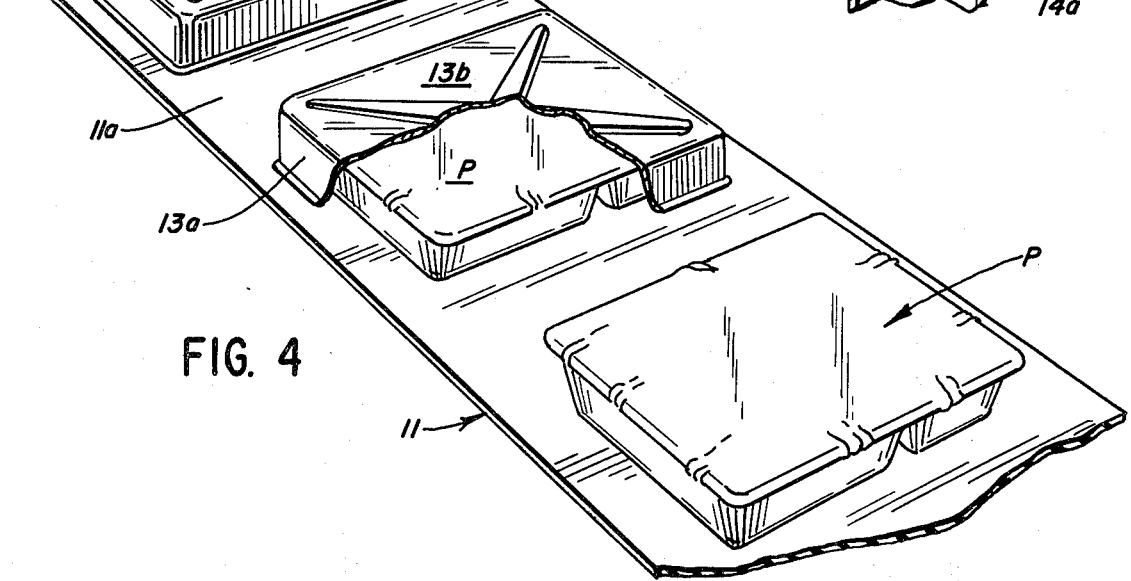
FIG. 4 is an enlarged fragmentary perspective view of the front infeed conveyor showing certain of the conveyed products encompassed by one form of the framelike member.

The product, prior to being frozen, may be packaged in a carton, box, or a drawn metallic tray or plate. Once the product has been prepackaged it is placed on an infeed conveyor 11 disposed at the front wall 12a of the freezer housing 12. The conveyor extends to an entry E formed in the freezer front wall, see FIG. 1. The conveyor-supported product is encompassed by a framelike member 13 prior to reaching the freezer entry E. The configuration of member 13, as seen in FIG. 4, may resemble that of an inverted tray. The sidewalls 13a of member 13 surround the product and the top of the product is covered by a top wall 13b. The member 13 may be molded or otherwise formed of plastic, metal, or other suitable substantially rigid thermal conductive material. Upon the product reaching the entry E, it is concealed within member 13.

Disposed within the freezer housing 12 are a plurality of refrigerated plates 14 which are arranged in a stacked superposed relation. When a given plate 14 is adjacent the entry E so that the upper surface 14a of the plate is coplanar with the upper segment 11a of the infeed conveyor 11, the plate disposed above the given plate 14 is elevated or spread apart an amount sufficient to allow products encompassed within framelike members to be successively fed by a pusher assembly 15 onto the upper surface 14a. As the products within the framelike members are pushed onto plate surface 14a, adjacent members 13 on the plate surface will abut one another and move towards the discharge opening D formed in the rear wall 12b of the freezer housing. When the plate upper surface 14a is completely filled, the adjacent plates are moved relative to one another until the members 13 are trapped therebetween and engaged by the plates and then the entrapped members are moved out of registry (either up or down) with respect to the entry E and discharge opening D. When the members are entrapped between adjacent refrigerated plates, the products encompassed by the members will rest upon the bottom plate and be refrigerated thereby.

After a predetermined time interval has elapsed whereby the product has attained the desired frozen state, the given plate is once again brought into registry with the entry E and discharge opening D and the adjacent plates are separated from one another whereupon the pusher assembly 15 is activated causing an elongated pusher bar 15a to move horizontally across the plate surface 14a and free the members 13 from either the upper or lower plate and then slide the members through the discharge opening D onto the upper segment 16a of a rear conveyor 16. Once the members have been deposited onto conveyor surface 16a and moved thereby to a predetermined station, the framelike members 13 are automatically lifted off surface 16a and deposited onto a third conveyor 17, see FIG. 7, while the frozen products remain on surface 16a and are conveyed thereby to a location, not shown, wherein they are packed for bulk shipping to the customer.

Conveyor 17, on the other hand, causes the removed members 13 to move through a washer-dryer unit U before they are reused and placed in a covering relation on the products disposed on the upper segment 11a of conveyor 11 upstream of the entry E.

It will be noted in FIG. 4 that the sidewall 13a of each member 13 is substantially vertical so that the problem of one abutting member riding up over the other abutting member is avoided when the members are being loaded onto or removed from the plate surface 14a by being pushed by the pusher bar 15a.

FIG. 5 shows a modified form of a framelike member 113 wherein no top panel is provided which overlies the top surface of the accommodated product P. It is desirable, however, that the height of the sidewalls 113a of member 113 be equal to, or slightly greater than, the maximum height of the accommodated product. Thus, when adjacent plates of the freezer entrap the members 113 therebetween, the members 113 will bear the load of the freezer plates disposed thereabove during the freezing cycle rather than the products themselves bearing such a load.

The area defined by the sidewalls of each member 13 or 113 should be such as to enable the member to be readily placed over the product or removed therefrom without striking or disturbing the product. Thus, when the members 13, 113 are being successively fed into and through the freezer, the accommodated products may shift a small amount within the members. Such relative movement of the product within the encompassing member is of no concern.

A further modified form of member 213 is shown in FIG. 6 wherein two or more products P, P' are arranged in side-by-side relation within the member. In such an arrangement it is important that the products be disposed in a lateral side-by-side relation relative to the direction of movement of the products through the freezer. That is to say, the products within the member should form a row which is perpendicular to the direction of movement of the member being fed through the freezer.

As in the case of members 13 and 113, member 213 should define an area greater than the combined areas of the plural products P, P' accommodated within the member 213, so as to facilitate positioning of the member over the plural products or removing the member therefrom. It is preferred that all forms of the member 13, 113 and 213 have sidewalls provided with flat vertically extending exterior surfaces so that proper abutting contact can be achieved between adjacent successively fed members.

In a normal operation of freezer 10, a prepackaged product having a thickness of approximately one inch can be frozen in approximately one hour to approximately 0° F. where the temperature of the product passing through the freezer entry E is approximately 80° F. The utilization of the framelike member will not have any significant adverse effect on the aforenoted freezing time.

Thus, a material handling system has been provided which greatly expands the capabilities of a contact plate freezer in accommodating a wide variety of prepackaged products without causing defacement or distortion of the products.

The improved material handling system eliminates, or substantially reduces, the possibility of the freezer being soiled due to spillage of the product while being successively fed through the freezer. The improved material handling system also prevents the freezer from becoming jammed by the products as the latter are fed through the freezer and, thus, avoids prolonged periods of freezer shutdown.

I claim:

1. A material handling system for use in successively pushing a plurality of products between a pair of refrigerated plates when the latter assume a predetermined separated substantially parallel relation, said system comprising a plurality of substantially rigid framelike members, each member being adapted to loosely encompass a predetermined number of products prior to the latter being fed between the pair of plates, each product and the encompassing framelike member moving substantially as a unit between the pair of separated plates, each member including an encompassing wall section having substantially planar exterior surface portions disposed substantially normal to the direction of travel of the product and member between the pair of plates, predetermined exterior surface portions of successive framelike members being in abutting relation while being moved between the pair of plates; the height of each wall section being at least substantially equal to the maximum height of the product encompassed thereby; said framelike members being successively removed from the products subsequent to said member and product being discharged from between the pair of plates.

2. The material handling system of claim 1 wherein the framelike member includes a cover panel extending from said wall section and adapted to overlie the accommodated product and be interposed the product and the upper plate of the pair of plates.

3. The material handling system of claim 2 wherein the framelike member is of unitary construction and formed of thermal conductive material.

4. The material handling system of claim 1 including first means for conveying a predetermined number of products and encompassing framelike member as a unit to a first station; second means movable independently of said first means for effecting successive pushing as a unit of the predetermined number of products and encompassing framelike member from the first station to between the pair of separated plates, each successive unit abutting the preceding unit disposed between the pair of separated plates until the area of the plate subtending the unit is fully occupied by abutting units; third means for conveying away from the pair of plates a unit upon same being discharged from between a pair of separated plates; fourth means for removing the framelike member from the accommodated predetermined number of products when the latter and encompassing framelike member have been conveyed by said third means to a second station; and fifth means for conveying the removed framelike member to said first means and repositioning the removed framelike member into accommodating relation with another predetermined number of products disposed on said first means prior to the latter predetermined number of products reaching the first station.

5. The material handling system of claim 1 wherein the framelike member simultaneously loosely encompasses at least a pair of products arranged in laterally disposed side-by-side relation with respect to the direction of movement of the products between the pair of separated refrigerated plates.

6. The material handling system of claim 4 wherein said fifth means includes means for washing the removed framelike member prior to the latter being repositioned on the predetermined number of products disposed on the first means.

* * * * *